2,708,673
PROCESS FOR THE PRODUCTION OF 11β,17α-DIHYDROXY-4-PREGNENE-3,20-DIONE

Robert H. Levin, Kalamazoo Township, Kalamazoo County, and Barney J. Magerlein, Kalamazoo, Mich., assignors to The Upjohn Company, Kalamazoo, Mich., a corporation of Michigan No Drawing. Application October 27, 1952, Serial No. 317,160

3 Claims. (Cl. 260—397.45)

The present invention relates to a certain steroid compound and is more particularly concerned with novel 11β,17α-dihydroxy-4-pregnene-3,20-dione and with the process of the production thereof.

The novel compound of the present invention and the process of the production thereof is indicated by the following representative formulae:

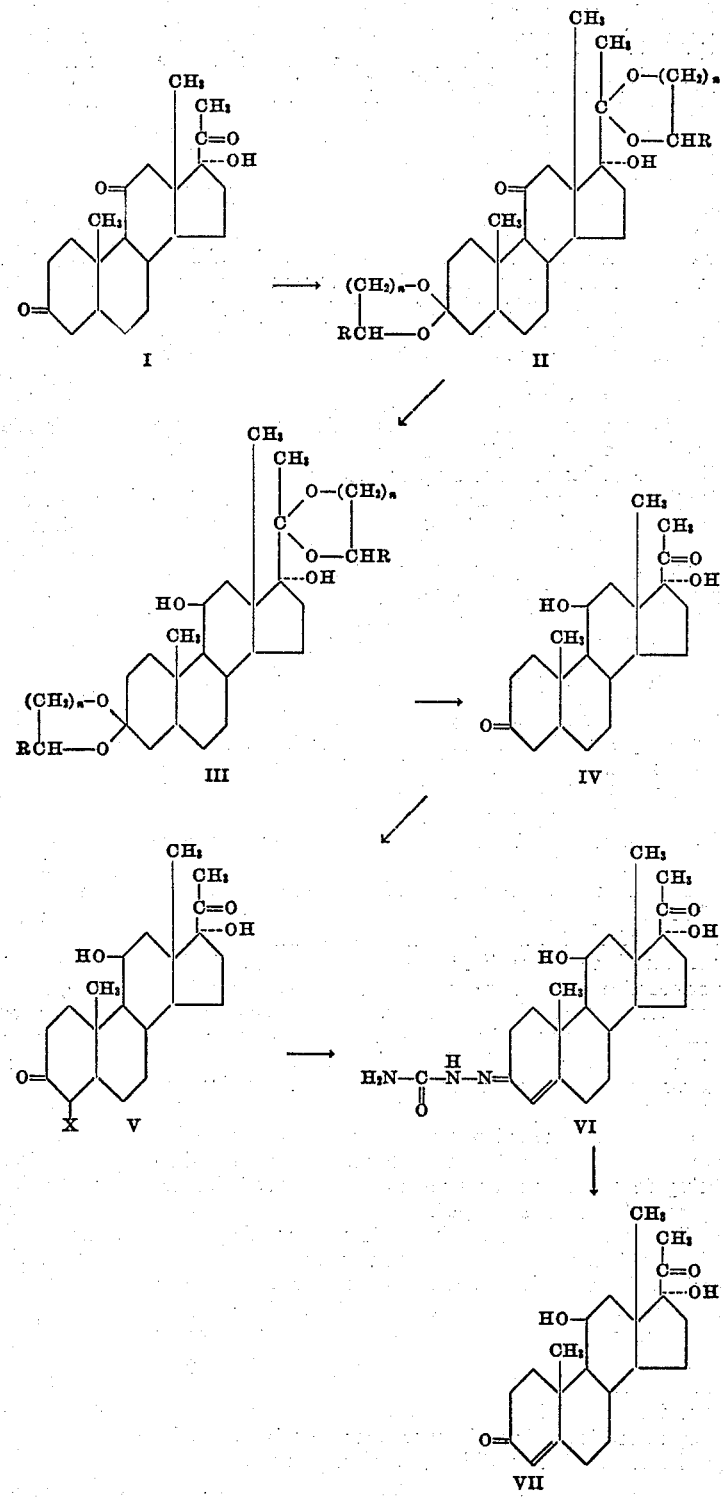

wherein R is selected from the group consisting of hydrogen and lower-alkyl groups, such as, for example, methyl, ethyl, propyl, isopropyl, butyl, isobutyl, amyl, hexyl, and the like, wherein $n$ is an integer from one to two inclusive, and wherein X is a halogen of atomic weight from 35 to 80 and is selected from chlorine and bromine.

The process of the present invention consists in heating together 17α-hydroxypregnane-3,11,20-trione (I) with an alkane-diol, preferably alkane-1,2-diols and alkane-1,3-diols, as for example, ethylene glycol, propane-1,2-diol, propane-1,3-diol, butane-1,2-diol, butane-2,3-diol, pentane-1,2-diol, 3-methylpentane-1,2-diol, hexane-1,3-diol, or the like, in the presence of an acid catalyst, to obtain the corresponding 17α-hydroxypregnane-3,11,20-trione, 3,20-cyclic diketal (II). Reduction with a metallic hydride or hydrogen in the presence of a catalyst of a diketal of formula II is productive of a 11β,17α-dihydroxypregnane-3,20-dione, 3,20-cyclic diketal (III) which is hydrolyzed with dilute mineral acid to give 11β,17α-dihydroxypregnane-3,20-dione (IV). Treatment of 11β,17α-dihydroxypregnane-3,20-dione with chlorine or bromine in a suitable solvent produces 4-halo-11β,17α-dihydroxypregnane-3,20-dione (V) which is reacted with a hydrazine compound, such as semicarbazone, 2,4-dinitrophenylhydrazine or other substituted hydrazine possessing one primary amino nitrogen, to give the corresponding hydrazone or semicarbazone (VI) which when treated with an aldehyde or ketone such as pyruvic acid or substituted benzaldehyde yields 11β,17α-dihydroxy-4-pregnene-3,20-dione (VII).

It is an object of the present invention to provide the novel compound 11β,17α-dihydroxy-4-pregnene-3,20-dione. Another object of the present invention is a process for the production of 11β,17α-dihydroxy-4-pregnene-3,20-dione. Other objects of the invention will be apparent to one skilled in the art to which this invention pertains.

The novel compound 11β,17α-dihydroxy-4-pregnene-3,20-dione has utility as an inhibitor for the secretion of adrenocorticotrophic hormone (ACTH) and therefore is of value in the treatment of diseases where oversecretion of ACTH and adrenal hormones occurs, for example in adrenal hyperplasia and pituitary basophilism (Cushing's disease). It also has utility as a stable, solid intermediate for the preparation of other physiologically active substances such as, for example, Kendall's Compound "F" acetate (11β,17α-dihydroxy-21-acetoxy-4-pregnene-3,20-dione). For this purpose 11β,17α-dihydroxy-4-pregnene-3,20-dione is treated with lead tetraacetate to give Kendall's Compound "F" acetate.

In carrying out the process of the present invention, 17α-hydroxypregnane-3,11,20-trione is admixed, using either order of addition, with at least the theoretical amount of the alkane-diol in an organic solvent, which is non-reactive under the reaction conditions, e. g., at a temperature between about twenty and about 200 degrees centigrade, preferably between about twenty and 150 degrees centigrade. Ordinarily, it is preferred to use an excess of the alkane, preferably between about five and about fifty moles per mole of the starting steroid. The time required for reaction is not critical and may be varied between about one and about 48 hours, the length of time being dependent on the temperature, the ketalizing reagent and catalyst employed.

The reaction can be conducted in any organic solvent with which the reactants and products are non-reactive, such as, for example, benzene, toluene, xylene, methylene chloride, petroleum ether, ether, or the like. However, the preferred solvents are those which co-distill with water and hence remove the water as it is formed in the course of the reaction. For this reason the reaction is usually conducted at the reflux temperature of the mixture, such temperature depending, of course, upon the solvent and the particular reaction conditions, e. g., pressure, employed.

The ketal-forming agents of the present invention are alkane-diols, preferably alkane-1,2-diols and alkane-1,3-diols, such as, for example, ethylene glycol, propane-1,2-diol, propane-1,3-diol, butane-1,2-diol, butane-2,3-diol, pentane-1,2-diol, 3-methyl-pentane-1,2-diol, hexane-1,3-diol, heptane-1,2-diol, octane-1,2-diol, and the like. The catalyst used in the method of the present invention may be any suitable acid catalyst and is preferably a mineral acid or an organic sulfonic acid. Representative catalysts are the meta- and para-toluenesulfonic acids, naphthalenesulfonic acid, benzenesulfonic acid, ortho-chlorobenzenesulfonic acid, hydrochloric acid, and sulfuric acid, with benzenesulfonic acids, e. g., para-toluenesulfonic acid, being preferred.

To reduce the thus-obtained 17α-hydroxypregnane-3,11,20-trione, 3,20-cyclic diketal, a reducing agent is added to the solution of the diketal in a solvent which is non-reactive under the conditions of reaction. Reducing agents such as, for example, lithium aluminum hydride, lithium borohydride, sodium borohydride, hydrogen in the presence of catalysts such as platinum or Raney nickel, and others are operative, with lithium aluminum hydride being preferred. Solvents such as, for example, ether, benzene tetrahydrofuran, petroleum ether and others are satisfactory. In the preferred embodiment of the process, lithium aluminum hydride is admixed with a suitable organic solvent such as, for example, ether, and the starting steroid dissolved in a non-reactive solvent such as, for example, benzene, and the admixtures then combined to form the reaction mixture.

The temperature of the reaction mixture is usually maintained between about zero and about 100 degrees centigrade, with a temperature between about room temperature and the reflux temperature of the reaction mixture being preferred, for a reaction period varying from about one-half to about eight hours or more. When lithium aluminum hydride is used as the reducing agent, the reaction is advantageously first conducted at temperatures between about zero and fifty degrees centigrade, preferably at about room temperature, while during the latter phases of the reaction higher temperatures are utilized, the reflux temperature of the reaction mixture usually being the upper temperature limit. The reactants are preferably admixed and stirred for about thirty minutes to one hour at room temperature and subsequently refluxed for thirty minutes or longer under atmospheric pressure, the total reaction time depending in part upon the ratio of the starting reactants and the temperatures employed.

The ratio of reducing agent to starting steroid may be varied considerably over a wide range, a substantial excess of the reducing agent generally being employed with mole-ratios of up to fifty to one and above being operative.

The desired 11β,17α-dihydroxypregnane-3,11,20-trione, 3,20-diketal is separated from the reaction product by conventional procedure. Thus, when employing reducing agents such as lithium aluminum hydride or sodium borohydride, the reaction mixture is hydrolyzed upon completion of the reduction followed by extraction and recrystallized from an organic solvent.

In order to obtain 11β,17α-dihydroxypregnane-3,20-dione from 11β,17α-dihydroxypregnane-3,20-dione, 3,20-cyclic diketal, the selected diketal is usually dissolved in a solvent which is non-reactive under the conditions of the reaction and the solution is then admixed with a hydrolyzing agent. Aqueous acid hydrolyzing agents are generally employed such as, for example, dilute mineral acids, organic acids such as para-toluenesulfonic acid in the presence of water, phosphoric acid, and others, with dilute mineral acids such as hydrochloric and sulfuric being preferred. Certain organic acids and other acidic agents are sometimes employed. Solvents such as acetone, methanol, dioxane, ethanol, and the like may be used, with acetone being preferred. Frequently it is desirable, as illustrated in Example 2, to utilize the reaction mixture from the prior step involving lithium aluminum hydride reduction of 17α-hydroxypregnane-3,11,20-trione, 3,20-diketal without first isolating the 11β,17α-dihydroxypregnane-3,20-dione, 3,20-diketal reaction product. In such case, the starting hydrolysis reaction mixture may also contain substantial quantities of unreacted lithium aluminum hydride and a mixture of solvents such as ether, benzene, or the like.

The hydrolyzing agent is usually employed in amounts greater than that theoretically required completely to hydrolyze the starting steroid. A one to 100-fold excess, or more, of hydrolyzing agent is operative, with a five to ten-fold excess usually being preferred. Usually the reaction mixture is stirred for about 24 hours at room temperature. The reaction period may be longer or as short as one hour, depending in part on the ketal used, in part on the reaction temperature, and in part on the concentration of the hydrolyzing agent. Use of higher concentrations of hydrolyzing agent and higher temperature usually reduces the required reaction period, temperatures between about zero degrees centigrade and about the boiling point of the reaction mixture being operative.

When hydrolysis is substantially complete, the product is isolated by conventional procedure, for example, when the resulting mixture is composed of an organic layer and a water layer, the organic layer is separated, the water layer is extracted with ether, and the ether solutions are combined. The combined ether extracts are then washed with water and dried using a drying agent such as anhydrous sodium sulfate. Filtration to remove the drying agent and distillation to remove the solvent gives the isolated product, which may be crystallized from any of the common organic solvents. Alternatively the product may be isolated by removing the solvent through distillation or by diluting the reaction mixture with water until crystallization of the product takes place.

11β,17α-dihydroxypregnane-3,20-dione, thus-obtained, is dissolved in an organic solvent, such as, for example, acetic acid, dichloromethane, chloroform, carbon tetrachloride, tertiary butyl alcohol, N,N-dimethylformamide, N,N-dimethylacetamide or other N,N-dialkylacylamides, with acetic acid being preferred, and to this solution is added the halogen, either as such or as a solution in the same solvent. The product is isolated by pouring the reaction mixture into a cooled sodium chloride solution and separating the precipitated product from the solution by filtration. The halogenation is conveniently conducted at room temperature, but temperatures of about zero to about 100 degrees centigrade are operative, with a temperature of about zero to about forty degrees centigrade being preferred. The halogen may be added in one portion, but preferably the addition is dropwise in order to avoid any large excess of the halogen in the reaction mixture. In this way each drop is added as soon as the previous drop has reacted as indicated by the loss of color. Consequently, the reaction period is wholly dependent on the reactivity of the steroid and the amount of halogen employed. Reaction periods of a few minutes to several hours are operative. The preferred molar ratio of 11β,17α-dihydroxypregnane-3,20-dione to halogen is one mole of the steroid to about 1.0 to 1.3 moles of the halogen. If a smaller amount of halogen is used, it will be insufficient to complete the halogenation, whereas if much more than 1.3 moles of halogen to one mole of steroid is used, undesirable polyhalogenated products may be formed. Sometimes an acid catalyst is added to the reaction mixture to initiate or to speed up the reaction. For this purpose solutions of hydrobromic acid in acetic acid, para-toluenesulfonic acid, naphthalenesulfonic acid and other like compounds may be used. Dilution of the reaction mixture with water or aqueous sodium chloride solution precipitates the 4-halo-11β,17α-dihydroxypregnane-3,20-dione.

4-bromo- or 4-chloro-11β,17α-dihydroxypregnane-3,20-dione, thus-obtained, is dissolved in an organic solvent such as, acetic acid, acetone, dioxane, tertiary butyl alcohol, methylene dichloride or mixtures of these solvents with from five to 25 percent water, and to this solution is added, usually with continuous stirring, a solution of a substituted hydrazine having a primary amino nitrogen in the hydrazine group. The substituted hydrazines which are useful in this reaction are semicarbazide, phenylhydrazine, 2,4-dinitrophenylhydrazine, para-nitrophenylhydrazine, α- or β-naphthylsemicarbazide, 2,4- and 3,5-dinitrophenylsemicarbazide, with semicarbazide preferred. The preferred temperature at which the reaction is carried out is between about fifteen and about forty degrees centigrade, however, temperatures between about zero degrees and about 100 degrees centigrade are operative. The time of reaction varies from about half an hours to six hours or even longer and during this period a color change from colorless to yellow or orange and back to colorless is noted. Alternatively, the 11β,17α-dihydroxy-4-pregnene-3,20-dione, 3-substituted hydrazone thus-obtained may be isolated from the mixture by adding more water and filtering the precipitated compound, or, in the preferred embodiment of the invention, may be immediately reacted in the solution with an aldehyde or ketone. The aldehydes or ketones used are usually pyruvic acid, pyruvic aldehyde and substituted benzaldehydes. Pyruvic acid is preferred as it is water soluble and can be used in aqueous organic solvents such as dioxane-water solution, while substituted benzaldehydes, such as para-hydroxybenzaldehyde and the carboxybenzaldehydes are usually used in acetic acid solutions. The temperature of reaction may vary between about zero and about 100 degrees with temperatures between about 25 and about seventy degrees preferred. The reaction time depends on the temperature and varies at room temperature between eight and 36 hours, while, at temperatures between fifty to seventy degrees centigrade, from one to about four hours is sufficient. The product, 11β,17α-dihydroxy-4-pregnene-3,20-dione is isolated from the solution by pouring the solution into water and extracting with a suitable solvent, such as dichloromethane, ether, or benzene.

The following examples illustrate the process and product of the present invention but are not to be construed as limiting.

EXAMPLE 1.—17α-HYDROXYPREGNANE-3,11,20-TRIONE, 3,20-ETHYLENE GLYCOL DIKETAL

A solution of 25 grams of 17α-hydroxypregnane-3,11,20-trione, 25 milliliters of distilled ethylene glycol, one gram of paratoluenesulfonic acid monohydrate and 500 milliliters of benzene was placed in a reaction flask equipped with a reflux condenser and a water trap. The mixture was heated under reflux with stirring for ten hours. The water which was formed was removed by co-distillation with benzene and collected in the water trap. The reaction mixture was cooled, washed with dilute sodium bicarbonate solution and with water, and then dried and concentrated to dryness under reduced pressure. The white crystalline residue was repeatedly recrystallized from ethyl acetate-Skellysolve B solution to yield 29.52 grams (94.6 percent) of 17α-hydroxypregnane-3,11,20-trione, 3,20-ethylene glycol diketal of melting point 185–186 degrees centigrade.

Analysis.—Calculated for $C_{25}H_{38}O_6$: C, 69.09; H, 8.81. Found: C, 69.01; H, 9.02.

Infrared analysis confirmed the postulated structure for 17α-hydroxypregnane-3,11,20-trione, 3,20-ethylene glycol diketal.

(1A) *11β,17α-dihydroxypregnane-3,20-dione, 3,20-ethylene glycol diketal*

To a solution of five grams of lithium aluminum hydride dissolved in 600 milliliters of anhydrous ether was added 29.5 grams of 17α-hydroxypregnane-3,11,20-trione, 3,20-ethylene glycol diketal dissolved in a solution of one hundred milliliters of ether and one hundred milliliters of benzene. The resulting mixture was stirred for one hour at room temperature after which time it was refluxed for another hour and then cooled and hydrolyzed with fifty milliliters of water. The organic layer was separated by decantation and the remaining paste was suspended in water and repeatedly extracted with methylene dichloride. The combined ether and methylene dichloride solutions were concentrated to give a quantitative yield of crystalline 11β,17α-dihydroxypregnane-3,20-dione-3,20-ethylene glycol diketal. Infrared analysis confirmed the postulated structure for 11β,17α-dihydroxypregnane-3,20-dione, 3,20-ethylene glycol diketal.

(1B) *11β,17α-dihydroxypregnane-3,20-dione*

29.5 grams of 11β,17α-dihydroxypregnane-3,20-dione, 3,20-ethylene glycol diketal was dissolved in 600 milliliters of acetone and thereto was added a solution of four milliliters of sulfuric acid in one hundred milliliters of water. The solution thus-obtained was allowed to stand at room temperature during a period of sixteen hours, after which time the acid was neutralized with sodium bicarbonate and the acetone distilled off in vacuo. The remaining aqueous suspension was filtered and the crystalline precipitate was washed with water and dried. The crude yield was 19.5 grams (82.7 percent). After recrystallization of this material from 200 milliliters of ethyl acetate 14.04 grams (46.7 percent) of 11β,17α-dihydroxypregnane-3,20-dione of melting point 213 to 221 degrees centigrade was obtained.

(1C) *11β,17α-dihydroxypregnane-3,20-dione*

One gram of 17α-hydroxypregnane-3,11,20-dione, 3,20-ethylene glycol diketal dissolved in twenty milliliters of anhydrous benzene was added to a solution of one gram of lithium aluminum hydride in 75 milliliters of anhydrous ether. The reaction mixture was stirred for one hour at room temperature and heated under reflux for one hour. Without isolation of the intermediate 11β,17α - dihydroxypregnane - 3,20 - dione, 3,20-ethylene glycol diketal, the lithium aluminum complex of the diketal was hydrolyzed to give 11β,17α-dihydroxypregnane-3,20-dione by the slow addition of one hundred milliliters of dilute hydrochloric acid (fifty percent) and stirring of the acid mixture for a period of sixteen hours at room temperature. The organic layer was separated and the acidic solution extracted repeatedly with 25-milliliter portions of ether. The combined washings and organic layer are washed with sodium bicarbonate and water, and then dried oxer anhydrous sodium sulfate. 11β,17α-dihydroxypregnane-3,20-dione was recrystallzed from ethyl acetate and had a melting point of 208 to 212 degrees centigrade.

*Analysis.*—Calculated for C₂₀H₃₂O₄: C, 72.38; H, 9.26. Found: C, 72.51; H, 9.09.

(1D) *4-bromo-11β,17α-dihydroxypregnane-3,20-dione*

A solution of three grams of 11β,17α-dihydroxypregnane-3,20-dione was dissolved in fifty milliliters of acetic acid and thereto was added under vigorous stirring 29.2 milliliters of a solution of bromine in acetic acid containing 0.3096 gram of bromine and 0.0275 gram of sodium acetate per milliliter. The reaction was initiated by one drop of a solution of hydrobromic acid in acetic acid. The rate of addition was adjusted so that decolorization was achieved after each drop of bromine solution was added. At the completion of the reaction which required 25 minutes, the solution was poured into 900 milliliters of a cooled, filtered and saturated sodium chloride solution. The crude 4-bromo-11β,17α-dihydroxypregnane-3,20-dione, separated from the solution by filtration, weighed 3.18 grams and had a melting point of 195–197 degrees centigrade after it had been recrystallized from acetone. Infrared analysis confirmed the postulated structure for 4-bromo-11β,17α-dihydroxypregnane-3,20-dione.

*Analysis.*—Calculated for C₂₁H₃₁O₄Br: C, 59.01; H, 7.31; Br, 18.70. Found: C, 59.15; H, 7.46; Br, 18.30.

(1E) *11β,17α-dihydroxy-4-pregnane-3,20-dione*

A solution of 300 milligrams of 4-bromo-11β,17α-dihydroxypregnane-3,20-dione and 105 milligrams of semicarbazide in five milliliters of an eighty per cent dioxane-water mixture was stirred at room temperature for two hours. During this time the characteristic color change of colorless to orange to colorless was noted. 11β,17α-dihydroxy - 4 - pregnane-3,20-dione, 3-semicarbazone was not isolated, but treated with 0.3 milliltier of pyruvic acid in three milliliters of water at sixty degrees centigrade. The reaction mixture was then poured into water and extracted with methylene chloride. The methylene chloride solution of 11β,17α-dihydroxy-4-pregnene-3,20-dione was washed with water, cold one percent sodium hydroxide solution and water again. After drying the solution over anhydrous sodium sulfate, the methylene chloride was distilled off, leaving 233 milligrams (95.8 percent) of white crystals of 11β,17α-dihydroxy-4-pregnene-3,20-dione. Recrystallized from acetone, the crystals melted at 224 to 227 degrees centigrade.

*Analysis.*—Calculated for C₂₁H₃₀O₄: C, 72.80; H, 8.72. Found: C, 72.72; H, 8.70.

Infrared analysis confirmed the postulated structure for 11β,17α-dihydroxy-4-pregnene-3,20-dione.

EXAMPLE 2.—17α-HYDROXYPREGNANE-3,11,20-TRIONE, 3,20-PROPYLENE GLYCOL DIKETAL

A solution of 0.50 gram of 17α-hydroxypregnane-3,11,20-trione, five milliliters of propylene glycol, fifty milligrams of orthochlorobenzenesulfonic acid, dissolved in one hundred milliliters of toluene, is heated for ten hours, under reflux, while the water which is formed in the reaction is removed by co-distillation with toluene. The cooled solution is neutralized with sodium bicarbonate, washed with water, dried and concentrated to dryness in vacuo. The crystals of 17α-hydroxypregnane-3,11,20-trione, 3,20-propylene glycol diketal are recrystallized from ethyl acetate.

(2A) *11β,17α-dihydroxypregnane-3,20-dione, 3,20-propylene glycol diketal*

To a solution of one gram of lithium aluminum hydride dissolved in 75 milliliters of ether was added one gram of 17α - hydroxypregnane-3,11,20-trione, 3,20-propylene glycol diketal dissolved in twenty milliliters of benzene. The mixture was stirred for one hour at room temperature after which time it was refluxed for another hour and then cooled and hydrolyzed with the addition of water. The organic layer was separated, washed with water, dried, and concentrated to dryness to give 11β,17α-dihydroxypregnane-3,20-dione, 3,20-propylene glycol diketal.

(2B) *11β,17α-dihydroxypregnane-3,20-dione*

Following the procedure given in Example 1B, 11β,17α-dihydroxypregnane-3,20-dione, 3,20-propylene glycol diketal is hydrolyzed in acetone solution with dilute sulfuric acid to produce 11β,17α-dihydroxypregnane-3,20-dione.

Alternatively 11β,17α - dihydroxypregnane-3,20-dione may be obtained from 17α-hydroxypregnane-3,11,20-trione, 3,20-propylene glycol diketal by reduction of the diketal with lithium aluminum hydride and hydrolysis of the lithium aluminum complex with hydrochloric acid in the manner described in Example 1C.

(2C) *4-bromo-11β,17α-dihydroxypregnane-3,20-dione*

A solution of 320 milligrams (2.0 millimoles) of bromine in 3.2 milliliters of dimethylformamide was added dropwise to a solution of 716 milligrams (2.0 millimoles) of 11β,17α-dihydroxypregnane-3,20-dione in 6.8 milliliters of dimethylformamide at room temperature. The reaction mixture was stirred during the addition which required about three hours. After completion of the reaction, water was added and the precipitated 4-bromo-11β,17α-dihydroxypregnane-3,20-dione was separated by filtration, washed and recrystallized from acetone. Infrared analysis confirmed the identity of the compound.

(2D) *11β,17α-dihydroxy-4-pregnene-3,20-dione*

Using the same method as in 1E, 11β,17α-dihydroxy-4-pregnene-3,20-dione was prepared from 4-bromo-11β,17α-dihydroxypregnane-3,20-dione.

EXAMPLE 3.—17α-HYDROXYPREGNANE-3,11,20-TRIONE, 3,20-PROPANE-1,3-DIOL DIKETAL

In essentially the same manner as shown in Example 1, 17α-hydroxypregnane-3,11,20-trione, 3,20 - propane - 1,3-diol diketal is prepared by heating 17α-hydroxypregnane-3,11,20-trione with propane-1,3-diol dissolved in benzene with para-toluenesulfonic acid as catalyst.

(3A) *11β,17α-dihydroxypregnane-3,20-dione, 3,20 propane-1,3-diol diketal*

Following the procedure given in Example 1A, 11β,17α-dihydroxypregnane-3,20-dione, 3,20-propane-1,3-diol diketal is prepared using 17α-hydroxypregnane-3,11,20-trione, 3,20-propane-1,3-diol diketal instead of 17α-hydroxypregnane-3,11,20-trione, 3,20-ethylene glycol diketal.

(3B) *11β,17α-dihydroxypregnane-3,20-dione*

Following the procedure described in Example 1B, 11β,17α-dihydroxypregnane-3,20-dione is prepared by hydrolyzing 11β,17α-dihydroxypregnane-3,20-dione, 3,20-propane-1,3-diol diketal in acetone and aqueous sulfuric acid instead of 11β,17α-dihydroxypregnane-3,20-dione, 3,20-ethylene glycol diketal.

Alternatively 11β,17α-dihydroxypregnane-3,20 - dione may be obtained from 17α-hydroxypregnane-3,11,20-trione, 3,20-propane-1,3-diol diketal by reduction of the diketal with lithium aluminum hydride and hydrolysis of the lithium aluminum complex with hydrochloric or sulfuric acid in the manner described in Example 1C.

(3C) *4-chloro-11β,17α-dihydroxypregnane-3,20-dione*

11β,17α-dihydroxypregnane-3,20-dione (0.001 mole; 0.358 gram) was dissolved in five milliliters of dimethylformamide and a few crystals of para-toluenesulfonic acid were added. A chlorine solution was prepared by bubbling about 0.9 gram of gaseous chlorine into 25 milliliters of ice-cold dimethylformamide, resulting in a chlorine concentration, as determined by titration, of 1.04 N. To the solution containing the steroid, while being stirred, was added dropwise 2.3 milliliters (0.00120 mole) of the chlorine solution. Each drop was allowed to decolorize before the next was added. The reaction mixture was then diluted with fifty milliliters of water and cooled. The precipitate which formed was collected, washed with water, and dried. Infrared analysis confirmed the postulated structure for 4-chloro-11β,17α-dihydroxypregnane-3,20-dione.

(3D) *11β,17α-dihydroxy-4-pregnene-3,20-dione*

In a manner similar to Example 1E, 4-chloro-11β,17α-dihydroxypregnane-3,20-dione, dissolved in a mixture containing ninety percent tertiary butanol and ten percent water, was treated with semicarbazide and the resulting semicarbazone was heated with a solution of pyruvic acid in dioxane-water to sixty degrees centigrade. The reaction mixture was poured into water and extracted with methylene chloride. After elimination of the excess pyruvic acid in the methylene chloride layer through washing, the solvent was removed to give 11β,17α-dihydroxy-4-pregnene-3,20-dione.

In the same manner as described in Examples 1 through 3, inclusive, by reacting 17α-hydroxypregnane-3,11,20-trione with an alkanediol, preferably an alkane-1,2-diol or an alkane-1,3-diol in the presence of an acid catalyst in solution, the following compounds may be obtained: 17α-hydroxypregnane-3,11,20-trione, 3,20-butane-1,2-diol diketal, 17α-hydroxypregnane-3,11,20-trione, 3,20-butane-2,3-diol diketal, 17α-hydroxypregnane-3,11,20-trione, 3,20-butane-1,3-diol diketal, 17α-hydroxypregnane-3,11,20-trione, 3,20-pentane-1,2-diol diketal, 17α-hydroxypregnane-3,11,20-trione, 3,20-pentane-1,3-diol diketal, 17α-hydroxypregnane-3,11,20 - trione, 3,20 - hexane-1,2-diol diketal, 17α-hydroxypregnane-3,11,20-trione, 3,20-hexane-1,3-diol diketal, 17α-hydroxypregnane-3,11,20-trione, 3,20-heptane-1,2-diol diketal, 17α-hydroxypregnane-3,11,20-trione, 3,20-heptane-1,3-diol diketal, 17α-hydroxypregnane-3,11,20-trione, 3,20-octane-1,2-diol diketal, 17α-hydroxypregnane-3,11,20-trione, 3,20-octane-1,3-diol diketal, and other like diketals.

By reacting, as described in Example 1A, 2A, or 3A, a selected 17α-hydoxypregnane-3,11,20-trione, 3,20-alkanediol diketal with a reducing agent such as, for example, lithium aluminum hydride, lithium borohydride, sodium borohydride or hydrogen in the presence of a catalyst such as Raney nickel, platinum or other like catalyst in solution, the following representative compounds may be obtained: 11β,17α-dihydroxypregnane-3,20-dione, 3,20-butane-1,2-diol diketal, 11β,17α-dihydroxypregnane-3,20-dione, 3,20-butane-2,3-diol diketal, 11β,17α-dihydroxypregnane-3,20-dione, 3,20-pentane-1,2-diol diketal, 11β,17α-dihydroxypregnane-3,20-dione, 3,20-hexane-1,2-diol diketal, 11β,17α-dihydroxypregnane-3,20-dione, 3,20-heptane-1,2-diol diketal, 11β,17α-dihydroxypregnane - 3,20 - dione, 3,20 - octane - 1,2 - diol diketal, 11β,17α-dihydroxypregnane-3,20-dione, 3,20-butane-1,3-diol diketal, 11β,17α-dihydroxypregnane-3,20-dione, 3,20-pentane-1,3-diol diketal, 11β,17α-dihydroxypregnane-3,20-dione, 3,20-hexane-1,3-diol diketal, 11β,17α-dihydroxypregnane-3,20-dione, 3,20-heptane-1,3-diol diketal, 11β,17α-dihydroxypregnane-3,20-dione, 3,20-octane-1,3-diol diketal, and other like cyclic diketals.

By hydrolyzing with a mineral or a strong organic acid, as described in Example 1B, 1C, 2B or 3B, any of the above mentioned 11β,17α-dihydroxypregnane-3,20-dione, 3,20-alkanediol diketals or the 11β-lithium aluminum alkoxides thereof, 11β,17α-dihydroxypregnane-3,20-dione is obtained. Contacting this compound with bromine or chlorine in the manner described in Example 1D, 2C or 3C results in a 4-halo-11β,17α-dihydroxypregnane-3-20-dione, which, by dehydrohalogenation as described in Example 1E, 2D or 3D, produces 11β,17α-dihydroxy-4-pregnane-3,20-dione.

It is to be understood that the invention is not to be limited to the exact details of operation or exact compounds shown and described as obvious modifications and equivalents will be apparent to one skilled in the art, and the invention is therefore to be limited only by the scope of the appended claims.

We claim:

1. A process for the production of 11β,17α-dihydroxy-4-pregnene-3,20-dione which comprises: mixing 17α-hydroxypregnane-3,11,20-trione with an alkanediol containing from two to eight carbon atoms inclusive, in the presence of an acid catalyst; reducing the thus-obtained 17α-hydroxypregnane-3,11,20-trione, 3,20-cyclic diketal with a reducing agent to a 11β,17α-dihydroxypregnane-3,20-dione, 3,20-cyclic diketal; hydrolyzing the thus-obtained 11β,17α - dihydroxypregnane - 3,20-dione, 3,20-cyclic diketal with an acid to give 11β,17α-dihydroxypregnane-3,20-dione; contacting 11β,17α-dihydroxypregnane-3,20-dione with halogen having an atomic weight between 35 and 80 to produce 4-halo-11β,17α-dihydroxypregnane-3,20-dione; reacting the thus-produced 4-halo-11β,17α-dihydroxy-pregnane-3,20-dione with a hydrazine having a primary amine in the hydrazine group to form a 3-hydrazone of 11β,17α-dihydroxy-4-pregnene-3,20-dione; and then hydrolyzing the thus-produced 11β,17α-dihydroxy-4-pregnene-3,20-dione, 3- hydrazone with a carbonyl compound selected from the group consisting of aldehydes and ketones to produce 11β,17α-dihydroxy-4-pregnene-3,20-dione.

2. A process for the production of 11β,17α-dihydroxy-4-pregnene-3,20-dione which comprises: mixing 17α-hydroxypregnane-3,11,20-trione with ethylene glycol in the presence of an acid catalyst; reducing the thus-obtained 17α-hydroxypregnane-3,11,20-trione, 3,20-ethylene glycol diketal with lithium aluminum hydride to 11β,17α-dihydroxypregnane-3,20-dione, 3,20-ethylene glycol diketal; hydrolyzing the thus-obtained 11β,17α-dihydroxypregnane-3,20-dione, 3,20-ethylene glycol diketal with an acid to give 11β,17α-dihydroxypregnane-3,20-dione; contacting 11β,17α-dihydroxypregnane-3,20-dione with halogen having an atomic weight between 35 and 80 to produce 4-halo-11β,17α-dihydroxypregnane-3,20-dione; reacting the thus-produced 4-halo-11β,17α-dihydroxypregnane-3,20-dione with a semicarbazide to form a 3-semicarbazone of 11β,17α-dihydroxy-4-pregnene-3,20-dione; and then hydrolyzing the thus-produced 11β,17α-dihydroxy-4-pregnene-3,20-dione, 3-semicarbazone with pyruvic acid in the presence of water to produce 11β,17α-dihydroxy-4-pregnene-3,20-dione.

3. A process for the production of 11β,17α-dihydroxy-4-pregnene-3,20-dione which comprises: mixing 17α-hydroxypregnane-3,11,20-trione with propylene glycol in the presence of an acid catalyst; reducing the thus-obtained 17α-hydroxypregnane-3,11,20-trione, 3,20-propylene glycol diketal with lithium aluminum hydride to 11β,17α-dihydroxypregnane-3,20-dione, 3,20-propylene glycol diketal; hydrolyzing the thus-obtained 11β,17α-dihydroxypregnane-3,20-dione, 3,20-propylene glycol diketal with an acid to give 11β,17α-dihydroxypregnane-3,20-dione; contacting 11β,17α-dihydroxypregnane-3,20-dione with halogen having an atomic weight between 35 and 80 to produce 4-halo-11β,17α-dihydroxypregnane-3,20-dione; reacting the thus-produced 4-halo-11β,17α-dihydroxypregnane-3,20-dione with a semicarbazide to form a 3-semicarbazone of 11β,17α-dihydroxy-4-pregnene-3,20-dione; and then hydrolyzing the thus-produced 11β,17α-dihydroxy-4-pregnene-3,20-dione, 3-semicarbazone with pyruvic acid in the presence of water to produce 11β,17α-dihydroxy-4-pregnene-3,20-dione.

References Cited in the file of this patent

UNITED STATES PATENTS

| 2,288,854 | Stavely | July 7, 1942 |
| 2,356,154 | Fernholz | Aug. 22, 1944 |
| 2,590,978 | Kendall | Apr. 1, 1952 |
| 2,590,993 | McGuckin | Apr. 1, 1952 |
| 2,602,769 | Murray | July 8, 1952 |
| 2,622,081 | Bernstein | Dec. 16, 1952 |
| 2,628,966 | Graber | Feb. 17, 1953 |